(12) United States Patent
McColloch et al.

(10) Patent No.: US 9,857,542 B2
(45) Date of Patent: Jan. 2, 2018

(54) BIDIRECTIONAL OPTICAL TRANSCEIVER MODULE

(71) Applicant: NanoPrecision Products, Inc., El Segundo, CA (US)

(72) Inventors: Laurence R. McColloch, Santa Clara, CA (US); Michael K. Barnoski, Pacific Palisades, CA (US); Robert R. Vallance, Newbury Park, CA (US); Shuhe Li, Pasadena, CA (US)

(73) Assignee: NanoPrecision Products, Inc., El Segundo, CA (US)

( * ) Notice: Subject to any disclaimer, the term of this patent is extended or adjusted under 35 U.S.C. 154(b) by 0 days.

(21) Appl. No.: 15/224,413

(22) Filed: Jul. 29, 2016

(65) Prior Publication Data

US 2016/0334592 A1 Nov. 17, 2016

Related U.S. Application Data

(63) Continuation-in-part of application No. 15/143,525, filed on Apr. 30, 2016, and a continuation-in-part of application No. 14/695,315, filed on Apr. 24, 2015.

(51) Int. Cl.
| | |
|---|---|
| *G02B 6/42* | (2006.01) |
| *H04B 10/40* | (2013.01) |
| *H04B 10/25* | (2013.01) |
| *H04B 10/50* | (2013.01) |
| *H04B 10/60* | (2013.01) |

(52) U.S. Cl.
CPC ........... *G02B 6/4246* (2013.01); *G02B 6/428* (2013.01); *G02B 6/4214* (2013.01); *G02B 6/4224* (2013.01); *G02B 6/4245* (2013.01); *G02B 6/4283* (2013.01); *G02B 6/4295* (2013.01); *H04B 10/40* (2013.01); *H04B 10/25* (2013.01); *H04B 10/50* (2013.01); *H04B 10/60* (2013.01)

(58) Field of Classification Search
None
See application file for complete search history.

(56) References Cited

U.S. PATENT DOCUMENTS

| | | | |
|---|---|---|---|
| 6,318,908 B1 | 11/2001 | Nakanishi et al. | |
| 7,785,924 B2 | 8/2010 | McColloch | |
| 9,178,622 B2 | 11/2015 | Ruiz et al. | |
| 2009/0202244 A1 | 8/2009 | Jin et al. | |
| 2013/0322818 A1* | 12/2013 | Li | G02B 6/262 385/31 |
| 2014/0112668 A1* | 4/2014 | McColloch | G02B 27/62 398/135 |
| 2015/0249503 A1* | 9/2015 | Sone | G02B 6/4246 398/135 |

* cited by examiner

*Primary Examiner* — Darren E Wolf
(74) *Attorney, Agent, or Firm* — Morrison & Foerster LLP

(57) ABSTRACT

A compact bidirectional optical transceiver module is provided that has a bidirectional optical subassembly (BOSA) that includes a stamped metal optic that folds the optical pathway, alignment features that enable the optoelectronic components of the electrical subassembly (ESA) to be precisely aligned with the BOSA in all dimensions, and features that reduce the capacitance of the driver circuitry to improve signal integrity and widen the eye opening.

21 Claims, 8 Drawing Sheets

BIDIRECTIONAL OPTICAL TRANSCEIVER MODULE

CROSS-REFERENCE TO RELATED APPLICATIONS

This application is a continuation-in-part (CIP) application of U.S. application Ser. No. 15/143,525, filed on Apr. 30, 2016, entitled "A WALL PLATE HAVING A BUILT-IN MODEM FOR PERFORMING ELECTRICAL-TO-OPTICAL CONVERSION, OPTICAL-TO-ELECTRICAL CONVERSION AND PROTOCOL-TO-PROTOCOL CONVERSION," priority to the filing data of which is hereby claimed and which is hereby incorporated by reference herein in its entirety. This application also is a CIP application of U.S. application Ser. No. 14/695,315, filed on Apr. 24, 2015, entitled "METHOD AND DEVICE FOR MEASURING ALIGNMENT OF AN OPTICAL SURFACE OF A LENS BLOCK," priority to the filing data of which is hereby claimed and which is hereby incorporated by reference herein in its entirety.

FIELD OF THE INVENTION

The invention relates to optical communications over optical networks, and more particularly, to a bidirectional optical transceiver module for use in optical networks.

BACKGROUND

Optical networks are used to deliver data, voice and video services to multiple network subscribers using one or more optical fibers. The optical networks that are used to deliver the data, voice and video services may be either passive or active. In a passive optical network (PON), passive optical components such as optical combiners and splitters enable multiple subscribers to share the same optical fiber. Thus, the PON functions as a point-to-multipoint optical network. A PON may conform to any of a variety of PON standards, including, for example, gigabit-capable PON (GPON) (ITU G.984), gigabit-capable Ethernet PON (GEPON) (IEEE 802.3) and broadband PON (BPON) (ITU G.983). In an active optical network, electrically-powered equipment, such as switches, routers, and multiplexers, is used to distribute the signal to the subscriber premises. Thus, an active optical network, such as an active Ethernet optical network, operates as a point-to-point network.

Optical transceiver modules used in optical networks convert optical signals received via an optical fiber into electrical signals, and convert electrical signals into optical signals for transmission via an optical fiber. In the transmitter portion of a transceiver module, an opto-electronic light source such as a laser performs the electrical-to-optical signal conversion. In the receiver portion of the transceiver module, an opto-electronic light detector such as a photodiode performs the optical-to-electrical signal conversion. A transceiver module commonly also includes optical elements or optics, such as lenses, as well as electrical circuitry such as drivers and receivers. A transceiver module also includes one or more connector receptacles to which an optical fiber cable can be connected. The light source, light detector, optical elements and electrical circuitry can be mounted within a module housing. Various transceiver module configurations are known.

A bidirectional optical transceiver module can employ wavelength division multiplexing (WDM), such as coarse wavelength division multiplexing (CWDM), to achieve provide a transmission channel and a receive channel over a single fiber. WDM techniques are commonly employed in bidirectional optical transceiver modules. The opto-electronics of a WDM bidirectional transceiver module commonly include a laser that emits light of a first wavelength and a photodiode that receives light of a second wavelength. The optics of a WDM transceiver module commonly include one or more bandpass filters that are highly transmissive to some wavelengths and highly reflective to other wavelengths. The light beams are thus communicated along paths that include the one or more filters between the end of the fiber and the laser and photodiode. Due to space constraints and mechanical mounting considerations in the module, these elements can be positioned relative to one another in a manner that results in the optical path having a "zigzag" shape. For this reason, such a technique of implementing CWDM in a transceiver module is referred to as a "zigzag."

A need exists for a bidirectional optical transceiver module that is well suited for use in PON networks where the transmission and receive channels are separated by a relatively large wavelength difference and in more conventional CWDM networks where the wavelength difference is relatively small and typically affects only the specifications of the filter used in the optics.

BRIEF DESCRIPTION OF THE FIGURES

Many aspects of the invention can be better understood by referring to the following description in conjunction with the accompanying claims and figures. Like numerals indicate like structural elements and features in the various figures. For clarity, not every element may be labeled with numerals in every figure. The drawings are not necessarily drawn to scale, emphasis instead being placed upon illustrating the principles of the invention. The drawings should not be interpreted as limiting the scope of the invention to the example embodiments shown herein.

WRITTEN DESCRIPTION

Figure 1:
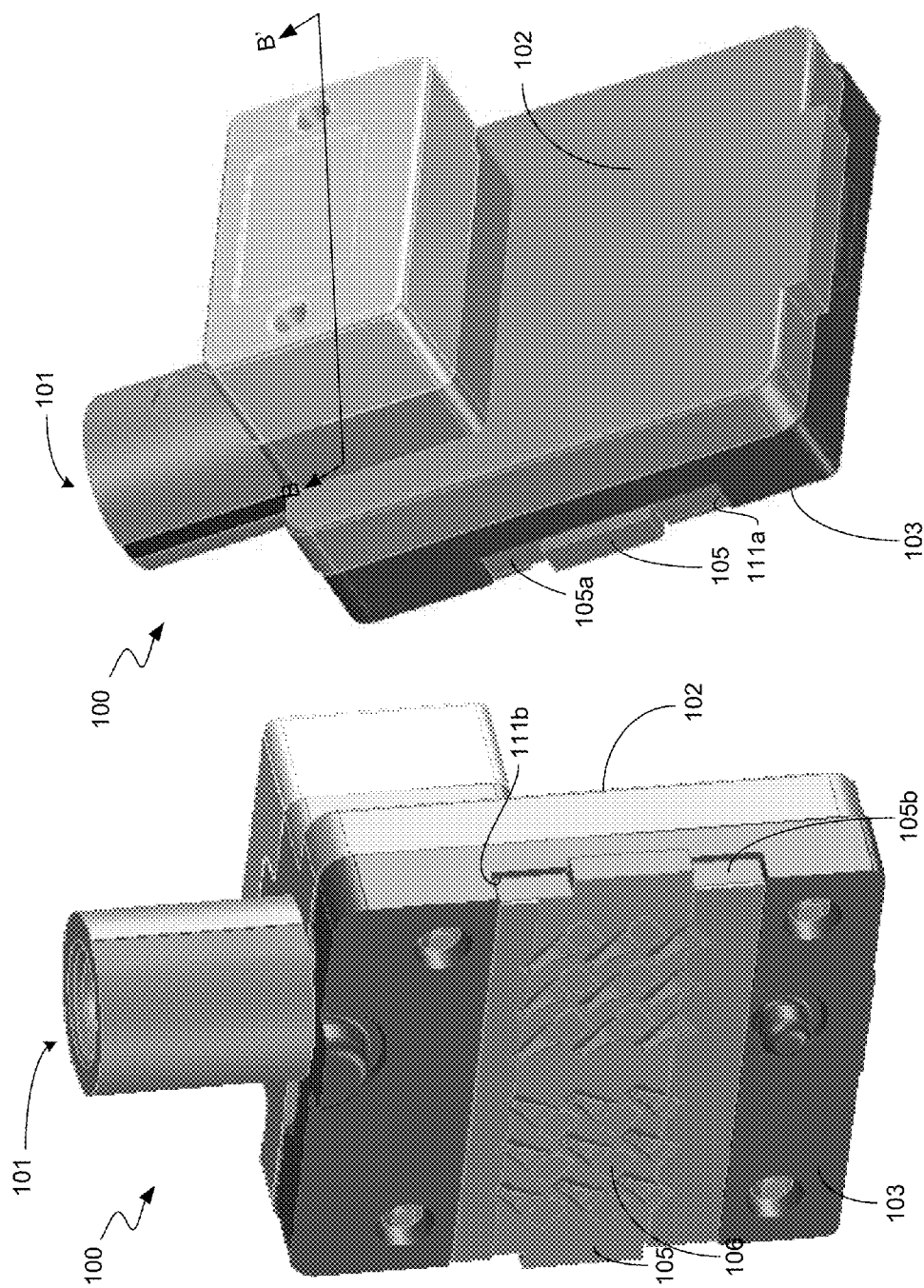
FIGS. 1A and 1B illustrate bottom and top perspective views, respectively, of a bidirectional optical transceiver module in accordance with an illustrative embodiment.

Throughout this description, embodiments and variations are described for the purpose of illustrating uses and implementations of inventive concepts. The illustrative description should be understood as presenting examples of inventive concepts, rather than as limiting the scope of the concept as disclosed herein. It should be further understood that certain words and terms are used herein solely for convenience and such words and terms should be interpreted as referring to various objects and actions that are generally understood in various forms and equivalencies by persons of ordinary skill in the art. It should also be understood that the word "example," as used herein, is intended to be non-exclusionary and non-limiting in nature. More particularly, the word "exemplary" as used herein indicates one among several examples, and it must be understood that no undue emphasis or preference is being directed to the particular example being described.

In terms of a general overview, the invention is directed to a compact bidirectional optical transceiver module is described herein that has a bidirectional optical subassembly (BOSA) that includes a stamped metal optic that folds the optical pathway, alignment features that enable the optoelectronic components of the electrical subassembly (ESA) to be precisely aligned with the BOSA in all dimensions, and features that reduce the capacitance of the driver circuitry to improve signal integrity and widen the eye opening. Illustrative, or exemplary, embodiments will now be described with reference to FIGS. 1A-8, in which like reference numerals represent like components, elements or features.

FIGS. 1A and 1B illustrate bottom and top perspective views, respectively, of the bidirectional optical transceiver module 100 in accordance with an exemplary embodiment. The module 100 has an optical port 101 for receiving an end of an optical fiber cable (not shown), an upper body portion 102, a lower body portion 103 that is secured to the upper body portion 102 to form a module housing, and various components contained inside of the module housing, as will be described below with reference to FIG. 2. The lower surface of the lower body portion 103 has a module PCB 105 secured to it, the bottom surface of which has a land grid array (LGA) 106 disposed on it. The electrical contacts of the LGA 106 make contact with respective electrical contacts of a system PCB (not shown) when the module 100 is mounted on and secured to the system PCB.

Figure 2:
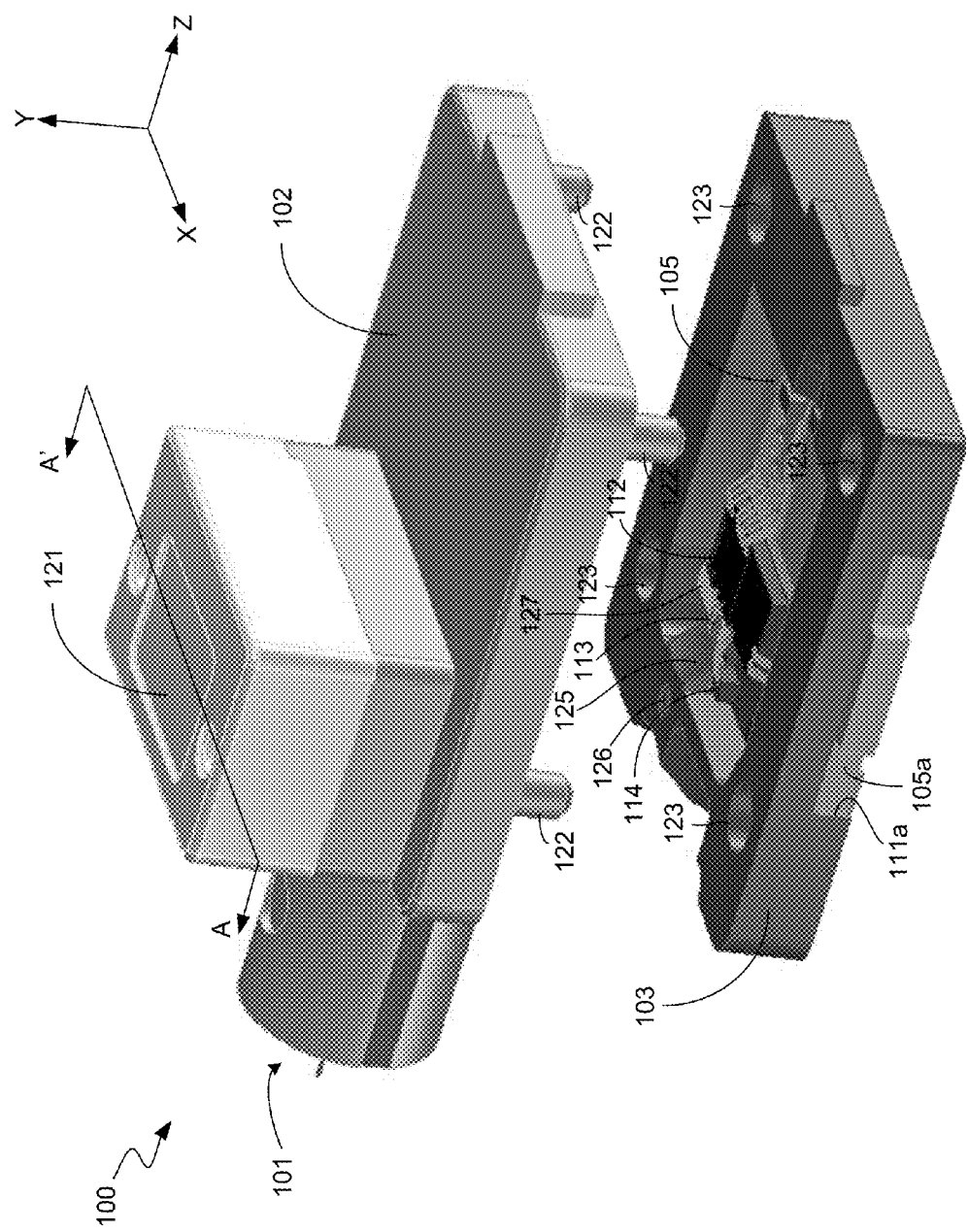
FIG. 2 illustrates a partially-exploded top perspective view of the bidirectional optical transceiver module shown in FIGS. 1A and 1B showing the upper body portion and the lower body portion of the module housing separated from one another to show components of the lower body portion.

FIG. 2 illustrates a partially-exploded top perspective view of the bidirectional optical transceiver module 100 shown in FIGS. 1A and 1B showing the upper body portion 102 and the lower body portion 103 separated from one another to show components of the lower body portion 103. The lower body portion 103 has the module PCB 105 mounted thereon such that side edges 105a and 105b (FIG. 1A) of the module PCB 105 pass through slots 111a and 111b (FIG. 1A), respectively, formed in the lower body portion 103. The top surface of the module PCB 105 has a combined transmitter (Tx)/receiver (Rx) IC chip 112, a laser diode chip 113 and a photodiode chip 114 mounted thereon. The light pathways for the signals being received and transmitted by the photodiode chip 114 and by the laser diode chip 113, respectively, are described below in more detail with reference to the BOSA of the module 100. The BOSA is housed in the upper body portion 102 of the module housing.

The upper body portion 102 is generally rectangular in shape except for the portion 121 that houses the BOSA (not shown) and the optical port 101, which, in accordance with this illustrative embodiment, is cylindrically-shaped and adapted to mate with an LC optical connector (not shown). A bottom surface of the upper body portion 102 has four cylindrically-shaped pins 122 thereon that are shaped and sized to mate loosely with cylindrically-shaped holes 123 formed in the lower body portion 103. The reason for the loose fit is that it allows some movement of the upper body portion 102 relative to the lower body portion 103 to achieve precise alignment between the BOSA (not shown) contained in portion 121 and the laser diode and photodiode chips 113 and 114, respectively. Once precision alignment has been achieved, an adhesive material such as epoxy, for example, is inserted into the space between the pins 122 and the holes 123 while the upper and lower body portions 102 and 103, respectively, are held in the precisely-aligned position until the adhesive material cures or hardens.

The lower body portion 103 is also generally rectangular in shape and comprises a metal (e.g., copper) leadframe. The holes 123 and the slots 111a and 111b are formed in the metal comprising the metal leadframe. An opening is formed in the bottom of the leadframe through which the bottom portion of the module PCB 105 having the LGA 106 thereon is exposed. As will be described below in more detail, the metal leadframe has various mounting surfaces, a stamped metal optic 125 and a fiducial feature 126 formed in it. The stamped metal optic 125 is used to couple light generated by the laser diode chip 113 into the upper body portion 102. The fiducial feature 126 is used for alignment of the chips 113 and 114 in the X and Y dimensions when mounting the chips 113 on the leadframe. In accordance with an embodiment, the laser diode chip 113 is mounted on a submount device 127 that is mounted on a mounting surface of the leadframe. The configuration and purpose of the submount device 127 is described below in more detail.

Figure 3:
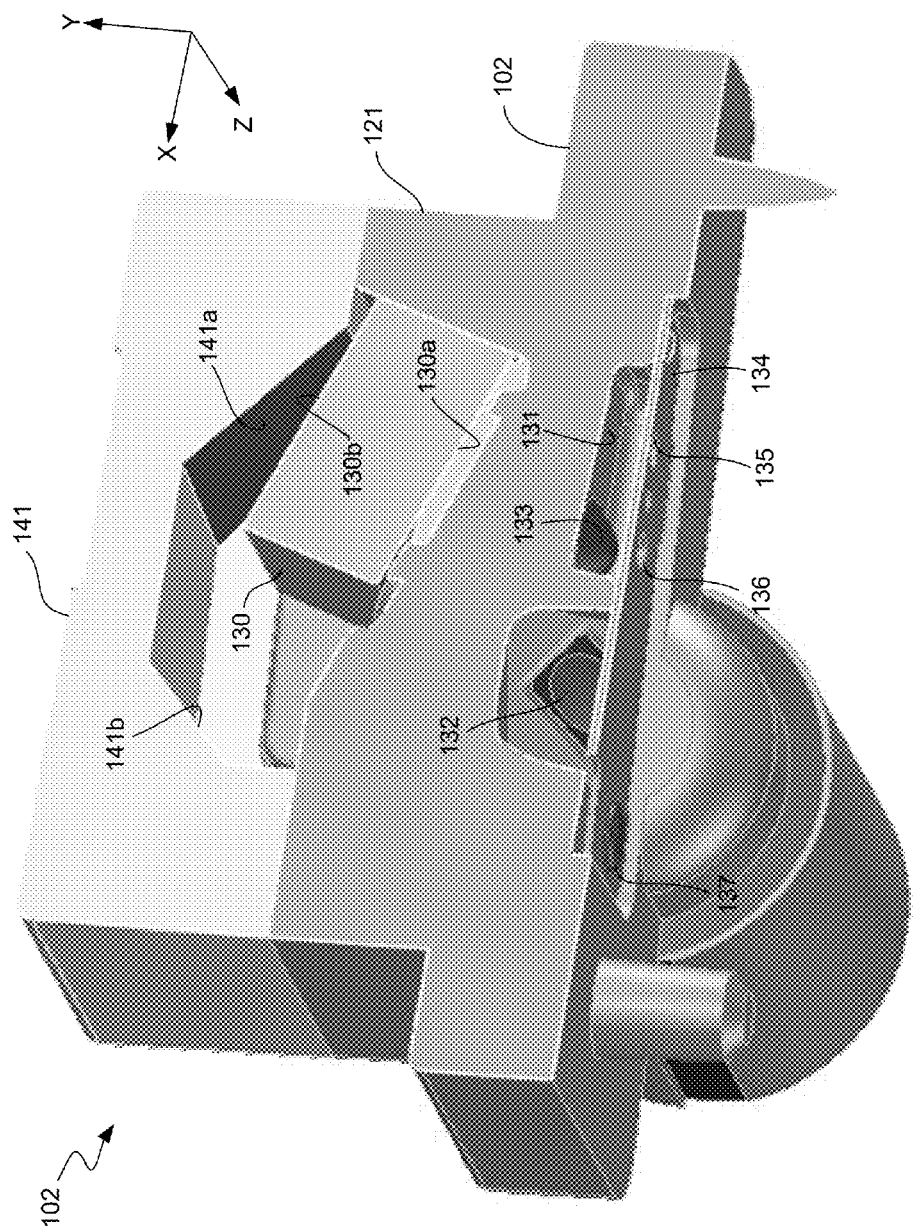
FIG. 3 illustrates a cross-sectional perspective view of the upper body portion shown in FIG. 2 taken along section line A-A'.

FIG. 3 illustrates a cross-sectional perspective view of the upper body portion 102 shown in FIG. 2 taken along section line A-A'. The portion 121 of the upper body portion 102 has surfaces that comprise part of the BOSA and houses a filter block 130 that comprises part of the BOSA. The BOSA has many similarities to a BOSA disclosed in parent U.S. application Ser. No. 14/695,315 (hereinafter "the '315 application") and has the same advantages, including, for example, compactness of the BOSA due to its zigzag design, which leads to a more compact bidirectional optical transceiver module and all of the associated benefits. The BOSA is also described in U.S. Pat. No. 9,385,829 (hereinafter "the '829 patent"), which is incorporated by reference herein in its entirety and which is assigned to the assignee of the present application. One of the main differences between the BOSA disclosed in the '315 application and the BOSA shown in FIG. 3 is that the BOSA of the '315 application includes a lens 50 (see, for example, FIG. 7 of the '315 application) that is not part of the BOSA shown in FIG. 3 of this application. Also, in the '315 application, the surface in which the lenses 50 and 52 are disposed is perpendicular to the optical axis of the laser diode whereas the surface 131 is an angled flat surface that is at a non-zero-degree angle relative to the optical axis of the laser diode of the laser diode chip 113 to prevent or reduce back reflection of light from the surface 131 onto the laser diode. The other features of the BOSA shown in FIG. 3 are identical to those of the BOSA described in the '315 application.

Some of the optical features of the BOSA are formed in the lower body portion 103, namely, the angled flat surface 131, a total internal reflection (TIR) lens 132 and a focusing lens 133. A baffle 134 having apertures 135-137 formed in it is secured to a lower surface of the lower body portion 103. A filter block 130 of the BOSA has a WDM filter 130a on a first surface thereof and a mirror 130b on a second surface thereof. A lid 141 is secured to the portion 121. The lid 141 has optical features of the BOSA formed in it, namely, first and second reflecting surfaces 141a and 141b, respectively.

The optical pathways within the BOSA are described in detail in the '315 application and in the '829 patent, and therefore only a brief discussion of the optical pathways will be provided herein. Light generated by the laser diode chip 113 passes through aperture 135 and is coupled by angled surface 131 onto the filter block 130. Light received in the BOSA is directed by the TIR lens 132 onto the filter block 130, directed by the filter block 130 onto the focusing lens 133 and is focused by the focusing lens 133 onto the photodiode chip 114. A portion of the laser light generated by the laser diode chip 113 is directed by the filter block 130 onto the first reflective surface 141a of the lid 140, reflected by the first reflective surface 141a onto the second reflective surface 141b of the lid 141, and directed by the second reflective surface 141b through the aperture 137 onto a monitor photodiode chip (not shown).

Figure 4:
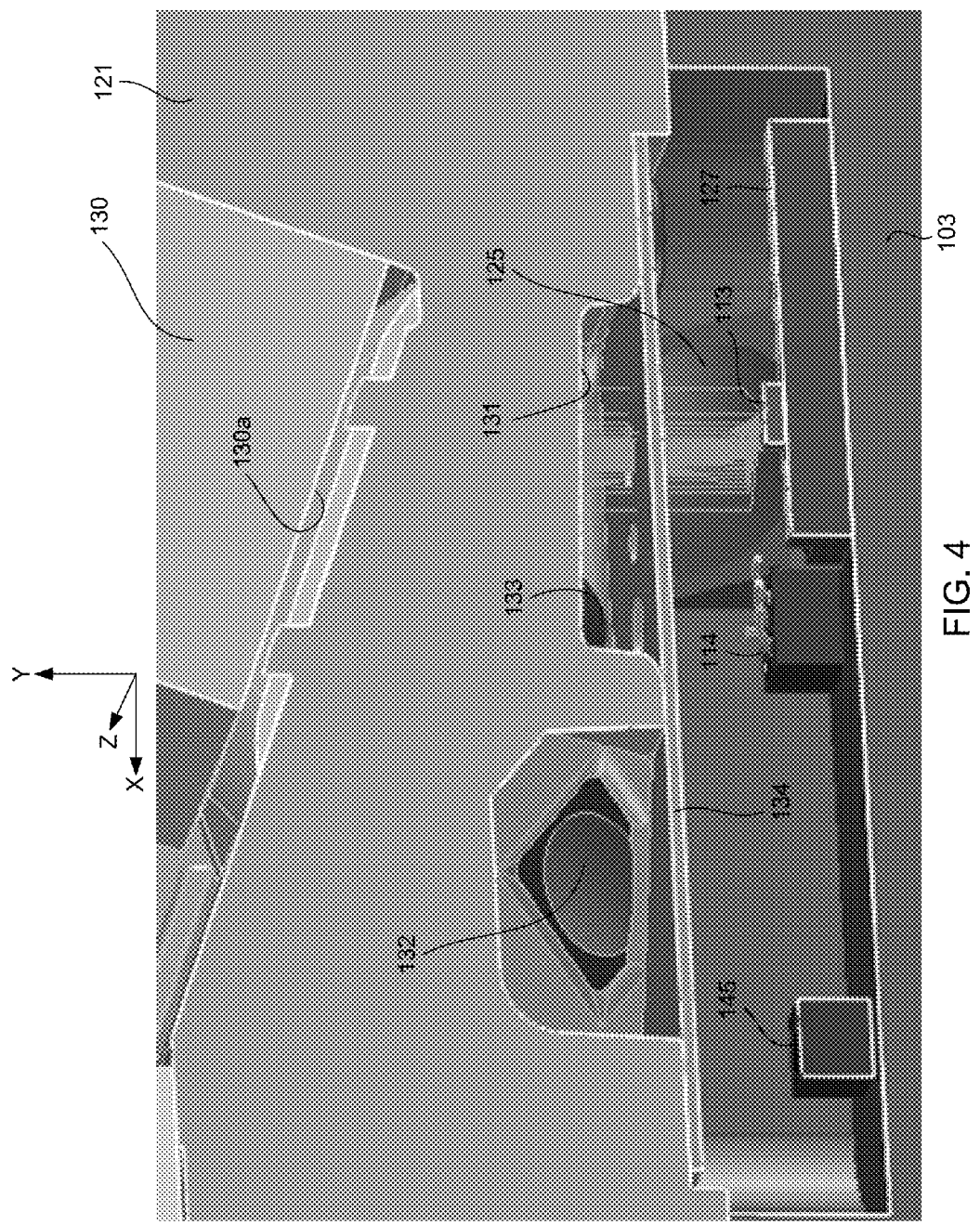
FIG. 4 illustrates an expanded cross-sectional view of a portion of the bidirectional optical transceiver module shown in FIG. 1B taken along section line B-B' to show the spatial relationship between some of the optical features of the BOSA and the components of the lower body portion.

FIG. 4 illustrates an expanded cross-sectional view of a portion of the bidirectional optical transceiver module 100 shown in FIG. 1B taken along section line B-B' to show the spatial relationship between some of the optical features of the BOSA and the components of the lower body portion 103. A monitor photodiode chip 145 that is not visible in FIG. 2 can be seen in FIG. 4. As indicated above, the laser diode chip 113 is mounted on a submount device 127. The photodiode chip 114 and the monitor photodiode chip 145 are mounted on a mounting surface of the leadframe of the lower body portion 103. The laser diode chip 113 has an edge-emitting laser diode that emits laser light from an edge facet of the laser diode toward the stamped metal optic 125. The stamped metal optic 125 folds the optical pathway by an angle of 90° and collimates the laser, directing the collimated light beam toward the flat angled surface 131. The stamped metal optic 125 preferably is convex in shape and has an aspherical profile defined by a polynomial of any order, typically a first-order (degree 1) polynomial or higher.

In optical transceiver modules, the most critical alignment tolerance is typically between the laser and the first collimating lens. The stamped metal optic 125 is the first collimating lens relative to the laser diode of the laser diode chip 113. A metal stamping processes is used to obtain the desired shape and position of the stamped metal optic 125 in the leadframe with great precision. The stamping punch tool that is used to stamp the stamped metal optic 125 can be formed by diamond turning, which allows tolerances on the order of tens of nanometers to be achieved. The fiducial feature 126 (FIG. 2) preferably is stamped in the same stamping punch that forms the stamped metal optic 125. This ensures that aligning the submount device 127 with the fiducial feature 126 when mounting the submount device 127 on the lower body portion 103 will result in precise alignment of the submount device 127 with the stamped metal optic 125 in the X and Y dimensions. The manner in which Z-dimensional alignment may be achieved is described below with reference to FIG. 7.

The submount device 127 is created using semiconductor fabrication processes, and therefore can also be formed with very high precision. A large number of the laser diode chips 113 are typically mounted on a wafer that contains the same number of the submount devices 127. Because the process of mounting chips on a wafer can be performed with great precision using current surface mount technology, the positions and orientations of the chips 113 relative to the respective submount devices 127 of the wafer can be performed with great precision. The process of creating the wafer of the submount devices 127, mounting the laser diode chips 113 on the wafer, coating the edge facets of the laser diode chips 113, and singulating the wafers is described below in more detail with reference to FIG. 8.

Because the position and orientation of the laser diode chip 113 relative to the submount device 127 is very precise, alignment of the submount device 127 with the fiducial feature 126 when mounting the submount device 127 on the lower body portion 103 will result in precise alignment of the laser diode chip 113 with the stamped metal optic 125 in the X and Z dimensions. The manner in which precise Y-dimensional alignment is achieved is described below with reference to FIG. 7.

Figure 5:
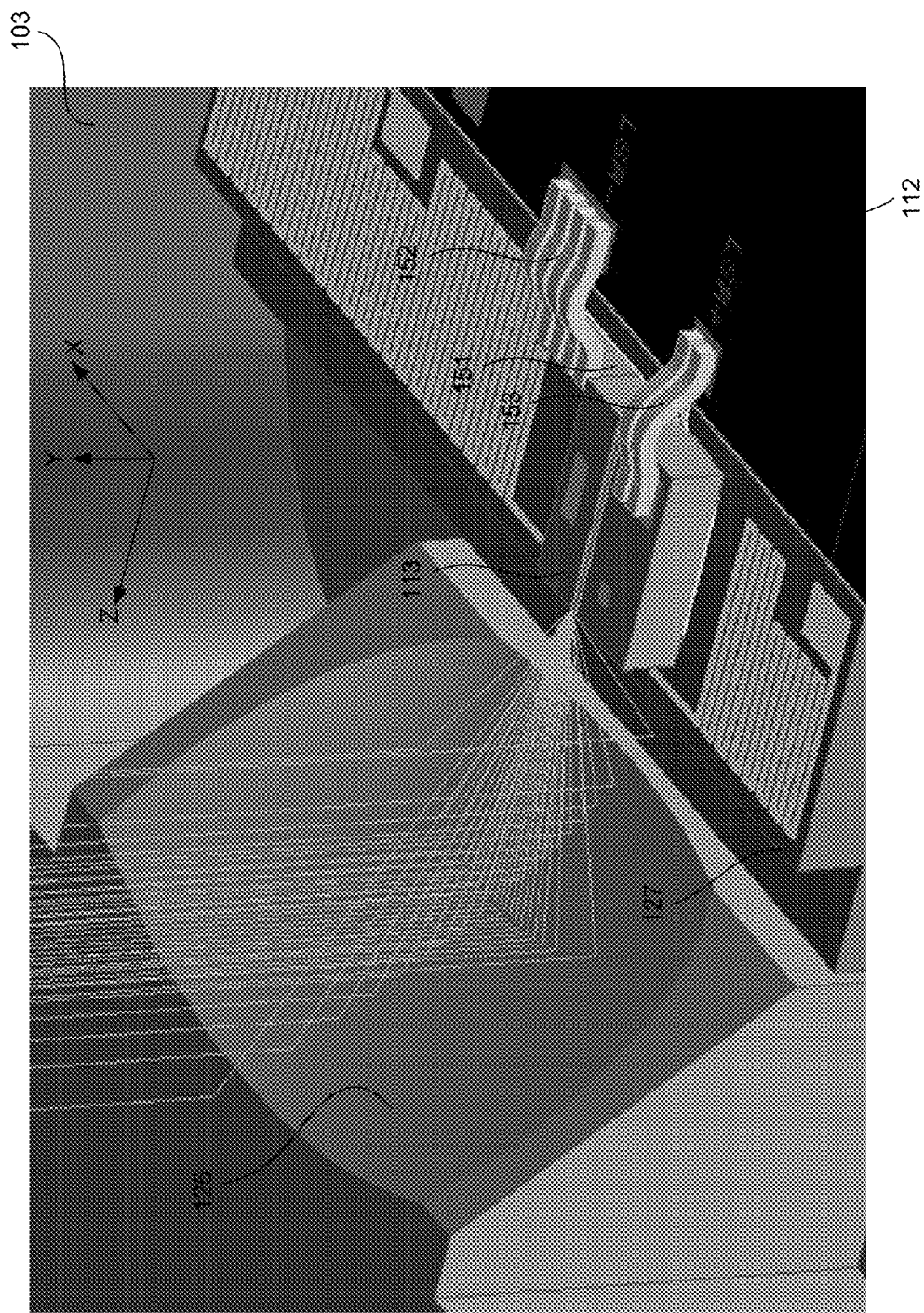
FIG. 5 illustrates an expanded perspective view of a portion of the lower body portion shown in FIG. 2.

FIG. 5 illustrates an expanded perspective view of a portion of the lower body portion 103 shown in FIG. 2 to show the manner in which the Tx/Rx IC chip 112 interfaces with the laser diode chip 113 and with the submount device 127. In accordance with a preferred embodiment, the edge-emitting laser diode of chip 113 is cathode driven, which means that the alternating current (AC) signal output from the Tx/Rx IC chip 112 is applied to the substrate of the laser diode chip 113. Using a cathode-driven edge-emitting laser diode allows the driver circuitry of the Tx/Rx IC chip 112 to be built with much lower capacitance than would be possible using an anode-drive edge-emitting laser diode. Using a non-conducting material for the submount device 127 further reduces capacitance. As will be described below with reference to FIG. 6, the portion of the submount device 127 on which the laser diode chip 113 is mounted is positioned over a notch formed in the leadframe of the lower body portion 103. The notch further reduces capacitance by keeping metal father away from the modulation signal. The overall reduction in capacitance allows performance benefits to be achieved in terms of improved signal integrity and a wider eye opening.

The laser diode chip 113 is mounted on an electrical contact pad 151 formed on the top surface of the submount device 127. A first set of short bond wires 152 connect an electrical contact pad of the Tx/Rx IC chip 112 to the electrical contact pad 151 to deliver AC electrical signals from the driver circuitry (not shown) of the Tx/Rx IC chip 112 to the cathode of the laser diode chip 113. A second set of short bond wires 153 connect an electrical ground contact pad of the Tx/Rx IC chip 112 to the anode of the laser diode chip 113.

Figure 6:
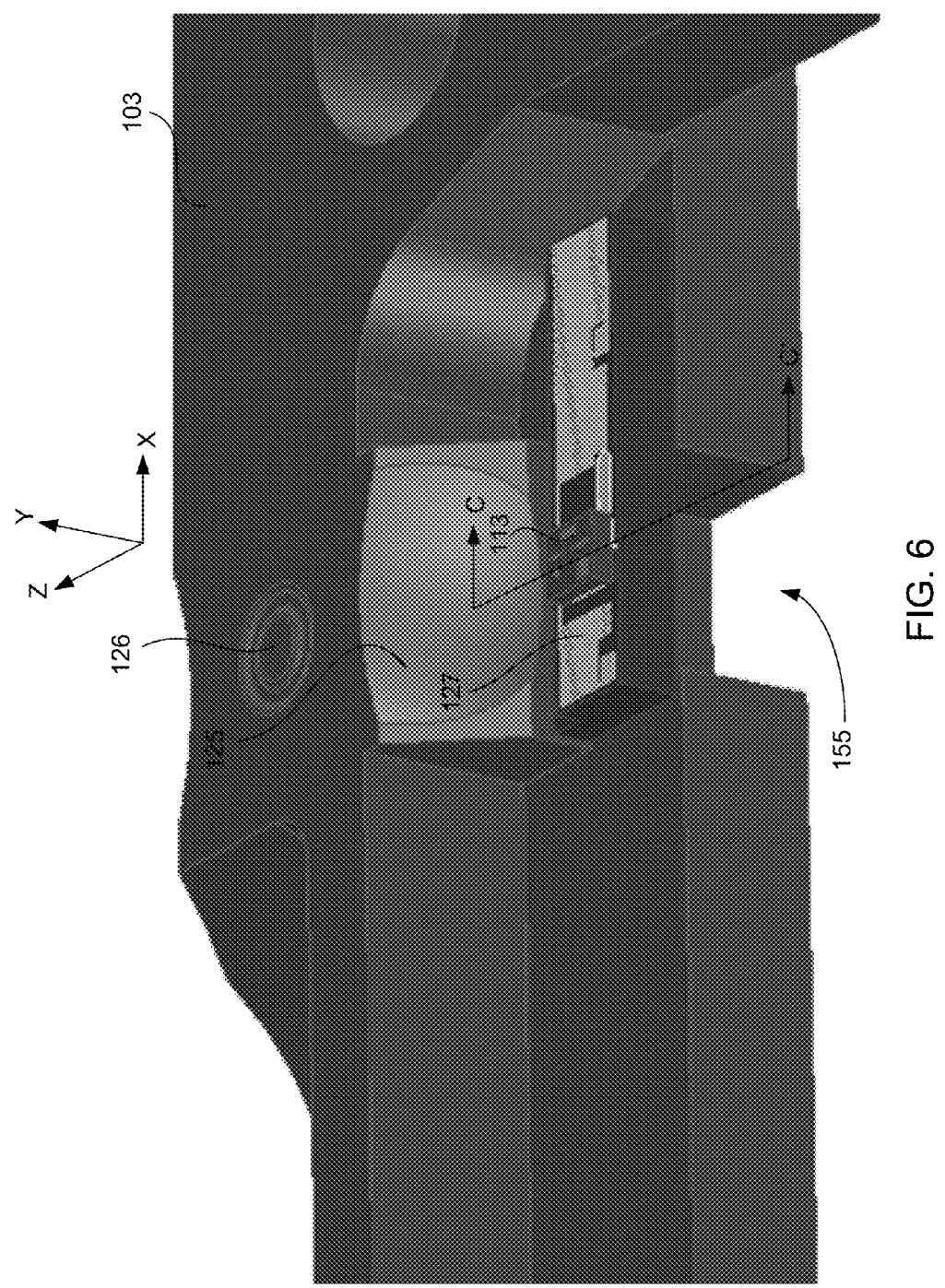
FIG. 6 illustrates an expanded perspective view of a portion of the lower body portion shown in FIG. 2 with the module PCB removed.

FIG. 6 illustrates an expanded perspective view of a portion of the lower body portion 103 shown in FIG. 2 with the module PCB 105 removed, which shows the notch 155 formed in the leadframe of the lower body portion 103 and the location of the submount device 127 and the laser diode chip 113 relative to the notch 155. Positioning the laser diode chip 113 above the notch 155 further reduces capacitance, thereby further improving signal integrity and the eye opening (i.e., reducing bit error rate).

Figure 7:
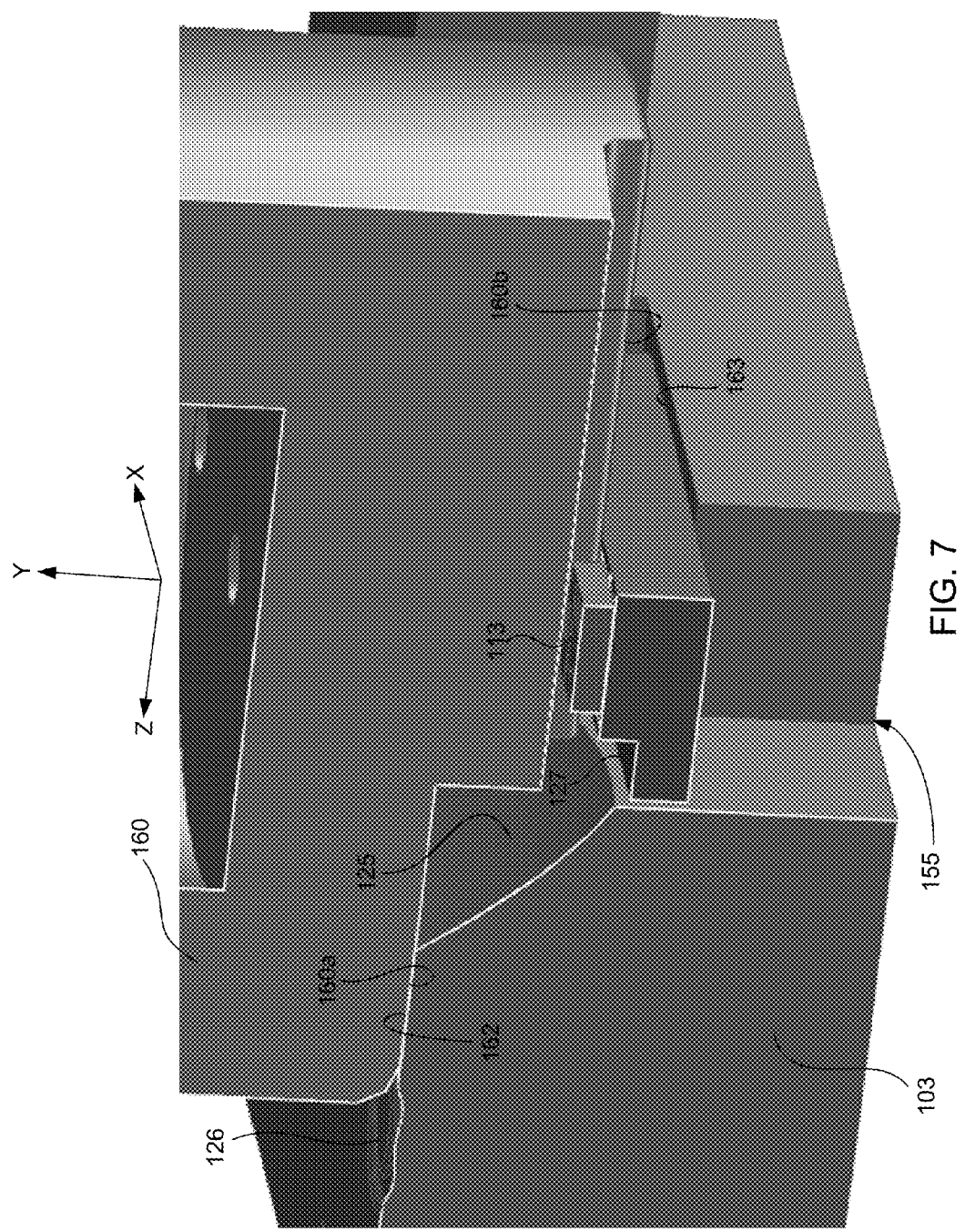
FIG. 7 illustrates a cross-sectional view of the lower body portion shown in FIG. 6 taken along section line C-C' with a die-attach collet being used to mount the submount device on the leadframe of the lower body portion.

FIG. 7 illustrates a cross-sectional view of the lower body portion 103 shown in FIG. 6 taken along section line C-C' with a die-attach collet 160 being used to mount the submount device 127 on the leadframe of the lower body portion 103. The die-attach collet 160 has a stop surface 160a and a die-attach surface 160b that are separated from one another in the Y-direction by a precise distance. A fiducial surface 162 of the leadframe of the lower body portion 103 acts as a fiducial feature for Y-dimensional alignment of the submount device 127. Before the submount device 127 is mounted on the leadframe, a layer of epoxy (not shown) is disposed on the mounting surface 163 of the leadframe. A pick-and-place machine (not shown) operating in conjunction with a vision system (not shown) is then used to mount the submount device 127 on the mounting surface 163 in X, Z alignment with the fiducial feature 126. The collet 161 is then used to press downward in the Y-direction against the top surface of the submount device 127 until the stop surface 160a of the collet 161 abuts the fiducial surface 162 of the leadframe, which changes the thickness of the epoxy layer and precisely passively aligns the submount device 127 with the stamped metal optic 125 in the Y-dimension.

Figure 8:
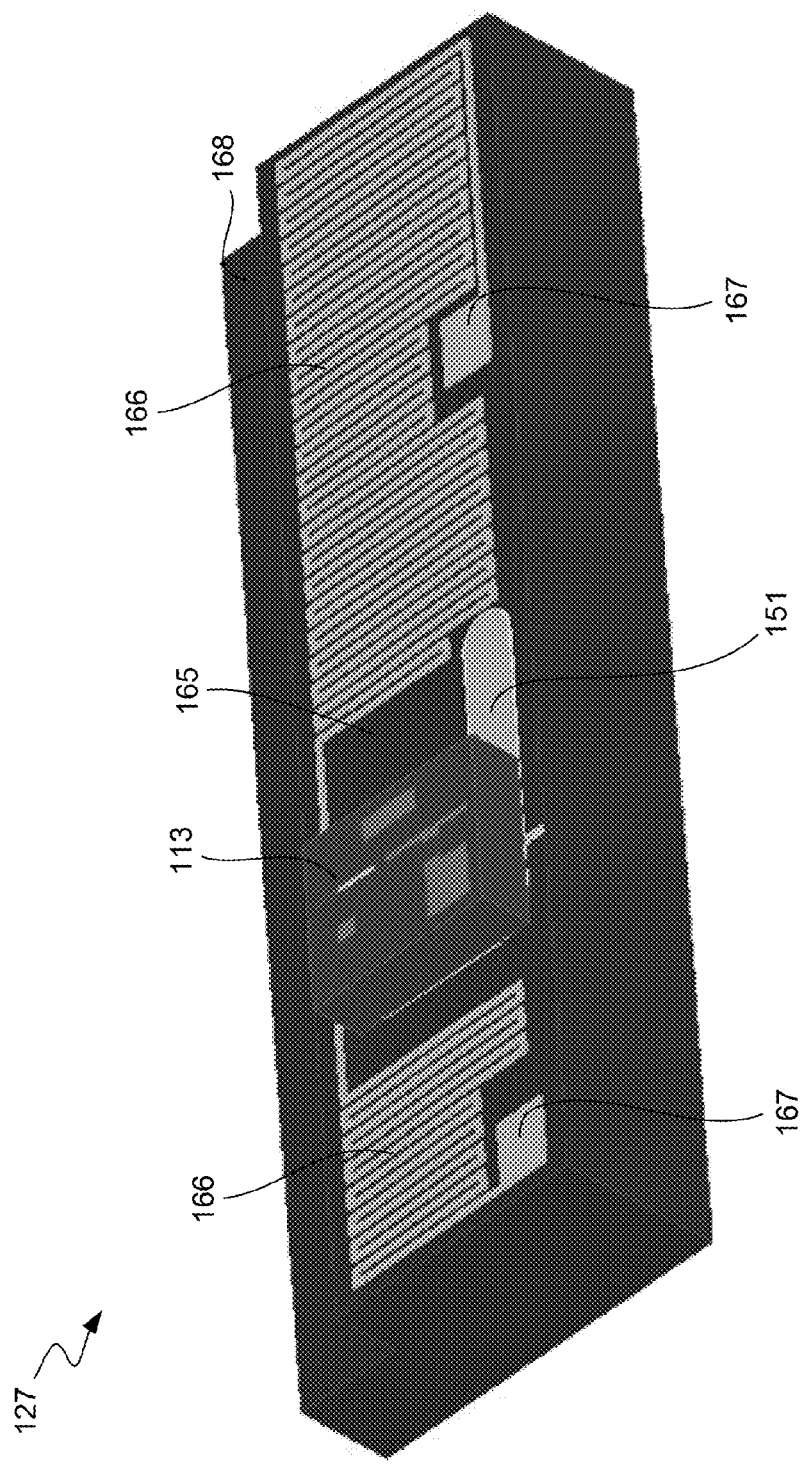
FIG. 8 illustrates a top perspective view of the submount device shown in FIG. 6 with the laser diode chip attached to its top surface.

FIG. 8 illustrates a top perspective view of the submount device 127 with the laser diode chip 113 attached to its top surface 165. As indicated above, the submount device 127 may be formed using semiconductor fabrication processes to simultaneously fabricate a large number of the submount devices 127 on a wafer (not shown). For example, a two-inch wafer might have over a thousand submount devices 127 on it. The wafer is typically a non-conductive semiconductor material, such as non-doped silicon or aluminum nitride, for example. During fabrication of the wafer, a metallization process is performed to form patterns of metal on the top surface of the wafer, including the electrical contact pads 151. Because the metallization process has to be performed to form the electrical contact pads 151, other metal features may simultaneously be formed during the process. For example, in accordance with an embodiment, resistive temperature sensors 166 having contact pads 167 for taking temperature measurements with a probe (not shown) are formed on the wafer.

Prior to dicing the wafer, the laser diode chips 113 are mounted on the respective contact pads 151 using a typical die-attach process. The edge facets of the laser diode chips 113 are then coated with an anti-reflection (AR) coating. Edge-emitting laser diodes generally cannot be used in non-hermetically-sealed environments unless their edge facets are AR-coated. In accordance with this illustrative embodiment, the module housing of the module 100 is not hermetically sealed. Performing the AR-coating process at the wafer level is much easier than performing the process at the chip level because the laser diode chips 113 are very small and can be difficult to handle. After all of the wafer-level processes have been performed, the wafer is diced into the individual submount devices 127 having the respective laser diode chips 113 attached to them. In accordance with an embodiment, prior to dicing the wafer, the dicing saw is used to form a cutaway region 168 along the sides of the submount devices 127 that will face the stamped metal optic. The cutaway region 168 allows the devices 127 to be larger along the other sides and the bottom so that it is less frail and also provides a clearance for the laser beam that will be emitted from the edge facet that faces the stamped metal optic 125.

The bidirectional optical transceiver module 100 also has features that improve heat dissipation, which is important to keeping the laser diode chip 113 cool. The driver circuitry of the Tx/Rx IC chip 112 causes the chip 112 to generate a lot of heat. As shown in FIG. 5, the bond wires 152 and 153 are very short and the chips 112 and 113 are very close to one another. Keeping the bond wires 152 and 153 very short helps to improve signal integrity, but placing the chips 112 and 113 very close to one another can cause heat generated by chip 112 to be transferred to chip 113 and detrimentally impact its performance of chip 113. However, because chip 112 is mounted on the module PCB 105 (FIG. 2) and the submount device 127 is mounted on the leadframe of the lower body portion 103, the thermal pathways for the heat generated by the chips 112 and 113 remain separate. Heat generated by chip 112 flows down into the PCB 105 whereas heat generated by chip 113 flows down into the submount device 127 and from the submount device 127 into the leadframe. This ensures that heat generated by chip 112 does not detrimentally affect the performance of chip 113.

It should be noted that the invention has been described with reference to a few exemplary embodiments for the purpose of demonstrating principles and concepts of the invention. It will be understood by persons of skill in the art, in view of the description provided herein, that the invention is not limited to these illustrative embodiments. Persons of skill in the art will understand that many variations can be made to the illustrative embodiments without deviating from the scope of the invention.

What is claimed is:

1. A bidirectional optical transceiver module, comprising:
a module housing comprising an upper body portion and a lower body portion, the lower body portion including a metal leadframe having a stamped optic formed therein;
a module circuit board secured to the metal leadframe;
a first integrated circuit (IC) chip mounted on a surface of the circuit board and electrically interconnected with the circuit board;
a cathode-driven laser disposed within the module housing in alignment with the stamped metal optic, the cathode-driven laser being electrically coupled with the first IC chip;
at least a first photodetector disposed within the module housing, the first photodetector being electrically coupled with the first IC chip; and
a bidirectional optical subassembly (BOSA) disposed within the upper body portion in alignment with the first photodetector and the stamped metal optic, the BOSA being optically aligned with the stamped metal optic and being configured to direct light output by the cathode-driven laser and directed to the BOSA by the stamped metal optic into an end of an optical waveguide held in a receptacle of the module housing and to direct light passing out of the end of the optical waveguide onto a light-receiving surface of the first photodetector.

2. The bidirectional optical transceiver module of claim 1 further comprising:
a submount device mounted on a surface of the metal lead frame, wherein the cathode-driven laser is mounted on the submount device.

3. The bidirectional optical transceiver module of claim 1, further comprising:
a second photodetector disposed inside of the module housing in alignment with the BOSA, the second photodetector being electrically coupled with the first IC chip, the BOSA directing a portion of the light output by the cathode-driven laser chip onto a light-receiving surface of the second photodetector chip.

4. The bidirectional optical transceiver module of claim 3, wherein the first and second photodetector chips are mounted on a surface of the leadframe.

5. The bidirectional optical transceiver module of claim 2, wherein the metal leadframe has a notch formed therein where metallic material comprising the metal leadframe has been removed, and wherein the submount device is mounted to portions of the leadframe on opposite sides of the notch.

6. The bidirectional optical transceiver module of claim 2, wherein the first optoelectronic device is mounted on the submount device in alignment with the notch.

7. The bidirectional optical transceiver module of claim 6, wherein the cathode-driven laser is mounted on a portion of the submount device that is directly over the notch.

8. The bidirectional optical transceiver module of claim 1, wherein the cathode-driven laser is an edge-emitting laser that emits a diverging light beam in directions toward the stamped metal optic, and wherein the stamped metal optic collimates the diverging light beam into a collimated light beam and redirects the collimated light beam by an angle of about 90° toward the BOSA, wherein the first IC chip includes laser driver circuitry for driving the edge-emitting laser.

9. The bidirectional optical transceiver module of claim 2, wherein the submount device is made of a non-electrically-conductive material.

10. The bidirectional optical transceiver module of claim 9, wherein the non-electrically-conductive material comprises one of undoped silicon and undoped aluminum nitride.

11. The bidirectional optical transceiver module of claim 9, wherein the submount device has a cutout region formed therein adjacent a facet of the cathode-driven laser to provide clearance for a diverging light beam output by the laser toward the stamped metal optic.

12. The bidirectional optical transceiver module of claim 1, further comprising:
a land grid array disposed on a surface of the circuit board opposite the surface of the circuit board on which the first IC chip is mounted.

13. The bidirectional optical transceiver module of claim 1, wherein the leadframe is generally rectangular in shape and has multiple holes therein that are complementary in shape to respective pins disposed on a lower surface of a rectangularly-shaped portion of the upper body portion, and wherein the pins are mated with the respective holes to mechanically couple the leadframe and the upper body portion together, and wherein the mechanical coupling of the upper body portion with the metal leadframe coarsely aligns the BOSA with the stamped metal optic and with the first photodetector.

14. The bidirectional optical transceiver module of claim 13, wherein the leadframe includes at least one stamped fiducial feature and at least one fiducial surface, the stamped fiducial feature being used to align the cathode-driven laser with the stamped metal optic in X and Z dimensions of an X, Y, Z Cartesian coordinate system, the fiducial surface being used to align the cathode-driven laser with the stamped metal optic in the Y dimension of the X, Y, Z Cartesian coordinate system.

15. The bidirectional optical transceiver module of claim 1, wherein the cathode-driven laser and the first photodetector device operate at first and second wavelengths, respectively, such that optical signals of the first and second wavelengths are transmitted and received by the module simultaneously.

16. A bidirectional optical transceiver module, comprising:
a module housing having an upper body portion and a lower body portion and having a cylindrically-shaped port formed in the upper body portion, the cylindrically-shaped port holding an end of an optical fiber, the lower body portion comprising a metal leadframe having a notch formed in a mounting surface thereof where metallic material comprising the metal leadframe has been removed;
a module circuit board secured to the leadframe, a lower surface of the module circuit board having an array of electrical contacts secured thereto for electrically interfacing the module with an external system circuit board;
a first integrated circuit (IC) chip mounted on an upper surface of the circuit board and electrically interconnected with the circuit board;
a submount device mounted on the mounting surface of the metal leadframe such that the submount device is in contact with portions of the leadframe that are on opposite sides of the notch;
a laser mounted on a portion of the submount device that is directly over the notch, the laser emitting a light beam of a first wavelength, the laser being electrically coupled with the first IC chip;
a first photodetector mounted on the metal leadframe, the first photodetector being electrically coupled with the first IC chip, the first photodetector detecting light of a second wavelength that is different from the first wavelength; and
a bidirectional optical subassembly (BOSA) disposed within the upper body portion, the BOSA being configured to direct light of the first wavelength emitted by the laser into an end of the optical fiber and to direct light of the second wavelength passing out of the end of the optical fiber onto a light-receiving surface of the first photodetector.

17. The bidirectional optical transceiver module of claim 16, wherein a lower portion of the upper body portion is rectangulary shaped, and wherein the leadframe is rectangularly shaped, the rectangularly-shaped lower portion and the rectangularly-shaped leadframe having about a same length and width, wherein mating features on the leadframe mate with complementarily-shaped mating features on the lower portion of the upper body portion to mechanically couple the upper body portion to the leadframe.

18. The bidirectional optical transceiver module of claim 16, wherein the laser is a cathode-driven edge-emitting laser and wherein the first IC includes driver circuitry for driving the edge-emitting laser.

19. The bidirectional optical transceiver module of claim 16, wherein the submount device is made of a non-electrically-conductive material.

20. The bidirectional optical transceiver module of claim 16, wherein the leadframe has a stamped metal optic formed therein that collimates light emitted by the laser into a collimated light beam and redirects the collimated light beam toward the BOSA.

21. A bidirectional optical transceiver module, comprising:
a module housing having an upper body portion and a lower body portion and having a cylindrically-shaped port formed in the upper body portion, the cylindrically-shaped port holding an end of an optical fiber, the lower body portion comprising a metal leadframe having a notch formed in a mounting surface thereof where metallic material comprising the metal leadframe has been removed, the leadframe having a stamped metal optic formed therein;
a module circuit board secured to the leadframe, a lower surface of the module circuit board having an array of electrical contacts secured thereto for electrically interfacing the module with an external system circuit board;
a first integrated circuit (IC) chip mounted on an upper surface of the circuit board and electrically interconnected with the circuit board;

a submount device mounted on the mounting surface of the metal leadframe such that the submount device is in contact with portions of the leadframe that are on opposite sides of the notch;

a cathode-driven edge-emitting laser mounted on a portion of the submount device that is directly over the notch, the edge-emitting laser emitting a diverging light beam of a first wavelength toward the stamped metal optic, the edge-emitting laser being electrically coupled with the first IC chip;

a first photodetector mounted on the metal leadframe, the first photodetector being electrically coupled with the first IC chip, the first photodetector detecting light of a second wavelength that is different from the first wavelength; and a bidirectional optical subassembly (BOSA) disposed within the upper body portion in alignment with the first photodetector and the stamped metal optic, the BOSA being optically aligned with the stamped metal optic and being configured to direct light output by the laser and directed to the BOSA by the stamped metal optic into the end of the optical fiber and to direct light passing out of the end of the optical fiber onto a light-receiving surface of the first photodetector.

* * * * *